United States Patent
Sun et al.

(10) Patent No.: US 12,418,580 B2
(45) Date of Patent: Sep. 16, 2025

(54) DATA RULE WORKLOAD DISTRIBUTION

(71) Applicant: INTERNATIONAL BUSINESS MACHINES CORPORATION, Armonk, NY (US)

(72) Inventors: Chun Hua Sun, Beijing (CN); Xu Bin Cai, Beijing (CN); Yi Yang Ren, Beijing (CN); Wei Wang, Beijing (CN); Pin Lv, Beijing (CN); Jian Ling Shi, Baoji (CN); Chun Leng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 18/539,563

(22) Filed: Dec. 14, 2023

(65) Prior Publication Data

US 2025/0202970 A1    Jun. 19, 2025

(51) Int. Cl.
*G06F 15/173* (2006.01)
*H04L 67/1008* (2022.01)
*H04L 67/1012* (2022.01)

(52) U.S. Cl.
CPC ...... *H04L 67/1008* (2013.01); *H04L 67/1012* (2013.01)

(58) Field of Classification Search
CPC ............... H04L 67/1008; H04L 67/1012
USPC ............................................. 709/226
See application file for complete search history.

(56) References Cited

U.S. PATENT DOCUMENTS

| | | | |
|---|---|---|---|
| 9,082,076 B2 | 7/2015 | Miranda et al. | |
| 9,300,749 B2 * | 3/2016 | Guerin | G06F 16/9014 |
| 9,304,814 B2 | 4/2016 | Li et al. | |
| 9,332,083 B2 * | 5/2016 | Gao | G06F 16/245 |
| 9,451,042 B2 * | 9/2016 | Guerin | G06F 16/245 |
| 9,465,770 B2 * | 10/2016 | Guerin | G06F 16/86 |
| 10,178,043 B1 * | 1/2019 | Ganjam | H04L 65/764 |

(Continued)

FOREIGN PATENT DOCUMENTS

| | | |
|---|---|---|
| AU | 2022202530 | 5/2022 |
| CN | 113590294 | 11/2021 |

OTHER PUBLICATIONS

Anonymous, "Data Quality Test Coverage Verification", ip.com No. IPCOM000270476D, Jul. 8, 2022; 5 Pages.

*Primary Examiner* — Alicia Baturay (74) *Attorney, Agent, or Firm* — Lily Neff; Andrew D. Wright; Calderon Safran & Wright P.C.

(57) ABSTRACT

A computer-implemented method may include generating a rule operator comprising a rule table; generating a rule operator group comprising rule operators containing similar rule tables; communicating the rule operator group to a shared compute node; retrieving table data associated with the rule table of a first rule operator within the rule operator group; reusing the table data associated with the first rule operator in a first runtime of additional rule operators corresponding to the rule operator group; determining at least one checker metric associated with a second runtime of a data rule; determining a workload state for the shared compute node based on the at least one checker metric; determining time taken and resource usage for a data rule during the second runtime; and balancing a workload of each compute node based on the workload state, time taken, and resource usage for the data rule during the second runtime.

20 Claims, 8 Drawing Sheets

(56) References Cited

U.S. PATENT DOCUMENTS

| | | | |
|---|---|---|---|
| 10,193,977 B2 | 1/2019 | Ke et al. | |
| 10,382,358 B1* | 8/2019 | Jain | H04L 43/16 |
| 10,848,436 B1* | 11/2020 | Ganjam | H04L 47/801 |
| 11,093,297 B2* | 8/2021 | Watt, Jr. | G06F 9/5083 |
| 11,677,818 B2* | 6/2023 | Pahwa | H04L 67/02 |
| | | | 709/203 |
| 2014/0068611 A1* | 3/2014 | McGrath | G06F 9/5083 |
| | | | 718/1 |
| 2014/0325519 A1 | 10/2014 | Li et al. | |
| 2016/0162320 A1* | 6/2016 | Singh | G06F 9/45533 |
| | | | 718/1 |
| 2017/0318091 A1 | 11/2017 | Ke et al. | |
| 2019/0306228 A1* | 10/2019 | Lau | H04L 67/1008 |

* cited by examiner

| Rule Operator Name | Expression (examples) |
|---|---|
| ">=" | extendedprice >= 10000.0 |
| exists | orderkey exists |
| contains | shipinstruct contains 'COD' |
| inRelCol | l_orderkey in_reference_column o_orderkey |
| regex | shipinstruct matches_regex '^DELIVER' |
| inRefList | shopmode in_reference_list {'MAIL    ','TRUCK    '} |
| occurs | commitdate occurs> 2 |
| equals | shipmode = 'MAIL' |
| unique | commitdate unique |
| matches | shipinstruct matches_format 'aaaa aaaa aaaaaaa' |
| isNum | shipmode is_numeric |
| datediff | datediff(shipdate,datevalue('1996-01-01')) > 30 |
| lcase | lcase(shipmode)='air' |
| substr | substring(shipmode,1,3)='SHI' |
| month | moth(shipdate)=10 |
| left | left(shipmode,3)='AIR' |
| trim | trim(shipmode)='AIR' |

| Rule Operator Name | Data Type | Cost(time) | CPU(cores) | Memory(MB) |
|---|---|---|---|---|
| avg | Int | 0:04:52 | 0.71 | 300 |
| contains | String | 0:02:10 | 0.83 | 200 |
| count | double | 0:07:08 | 0.19 | 500 |
| datediff | timestamp | 0:04:35 | 0.55 | 900 |
| day | ... | ... | ... | ... |
| equals | ... | ... | ... | ... |
| exists | ... | ... | ... | ... |
| inRefList | ... | ... | ... | ... |
| isNum | ... | ... | ... | ... |
| lcase | ... | ... | ... | ... |
| left | ... | ... | ... | ... |
| len | ... | ... | ... | ... |
| matches | ... | ... | ... | ... |
| max | ... | ... | ... | ... |
| min | ... | ... | ... | ... |

| Group Name | Operator Name | Data Type | Bind Column | Cost(time) Weight | CPU Weight |
|---|---|---|---|---|---|
| Data & Time | day | String | New | A1% | C1% |
| Data & Time | timestamp | String | Exist | A2% | C2% |
| Data & Time | date | Date | New | B1% | D1% |
| Data & Time | time | Date | Exist | B2% | D2% |

DATA RULE WORKLOAD DISTRIBUTION

BACKGROUND

Aspects of the present invention relate generally to methods and systems to balance data rule workload between compute nodes to improve overall performance and throughput.

In data governance, data quality is an important index in determining whether the data is fit for use. Data rules or data quality rules provide a set of rule logic to analyze data to determine whether the data meets certain data quality requirements such as completeness of data elements, consistency across data values, conformance to domain validation constraints, or other directives for use. Data rule definitions are used to develop rule logic to analyze data. For example, data rule definitions may be set up so that a variable, such as a word or term, is evaluated based on a specific condition or type of check. Data rules are created when the data rule definitions are associated with physical data sources. The rules are run to return analysis statistics and detailed results on data quality. The results provide the ability to ensure compliance with expected conditions or identify and review exceptions.

SUMMARY

In a first aspect of the invention, there is a computer-implemented method including: generating a rule operator comprising a rule table; generating a rule operator group comprising rule operators containing similar rule tables; communicating the rule operator group to a shared compute node; retrieving table data associated with the rule table of a first rule operator within the rule operator group; reusing the table data associated with the first rule operator in a first runtime of additional rule operators corresponding to the rule operator group; determining at least one checker metric associated with a second runtime of a data rule; determining a workload state for the shared compute node based on the at least one checker metric; determining time taken and resource usage for a data rule during the second runtime; and balancing a workload of each compute node based on the workload state, the time taken, and the resource usage for the data rule during the second runtime.

In another aspect of the invention, there is a computer program product including one or more computer readable storage media having program instructions collectively stored on the one or more computer readable storage media. The program instructions are executable to: generate a rule operator comprising a rule table; generate a rule operator group comprising rule operators containing similar rule tables; communicate the rule operator group to a shared compute node; retrieve table data associated with the rule table of a first rule operator within the rule operator group; reuse the table data associated with the first rule operator in a first runtime of additional rule operators corresponding to the rule operator group; determine at least one checker metric associated with a second runtime of a data rule; determine a workload state for the shared compute node based on the at least one checker metric; determine a time taken and a resource usage for a data rule during the second runtime; and balance a workload of each compute node based on the workload state, the time taken and the resource usage for the data rule during the second runtime.

In another aspect of the invention, there is a system including a processor set, one or more computer readable storage media, and program instructions collectively stored on the one or more computer readable storage media. The program instructions are executable to: generate a rule operator comprising a rule table; generate a rule operator group comprising rule operators containing similar rule tables; communicate the rule operator group to a shared compute node; retrieve table data associated with the rule table of a first rule operator within the rule operator group; reuse the table data associated with the first rule operator in a first runtime of additional rule operators corresponding to the rule operator group; determine at least one checker metric associated with a second runtime of a data rule; determine a workload state for the shared compute node based on the at least one checker metric; determine a time taken and a resource usage for a data rule during the second runtime; and balance a workload of each compute node based on the workload state, the time taken and the resource usage for the data rule during the second runtime.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

When running multiple data rules concurrently, the distribution of data rules to compute nodes is usually not evenly distributed. For example, after concurrently submitting five data rules, three data rules could be running on both a first compute node (e.g., compute0) and a second compute node (e.g., compute1), but the other two data rules only run on compute0 nodes, even though compute1 node's computational resources are available and not busy. Inefficiencies may arise when a compute node receives too many data rules relative to other compute nodes, even though a central processing unit's (CPU) usage is the same or lower than the other compute nodes due to different initiation times of the different data rules. Therefore, there remains a need to balance data rule workload to improve performance and throughput of a computer or processor set.

Aspects of the present invention relate generally to methods and systems to balance data rule workload between compute nodes to improve overall performance and throughput. In embodiments, the disclosed methods and systems analyze rule relationships to group similar rules together, reuse data within the same rule group, and continuously analyze rule time and resource cost to evenly distribute workload to compute nodes for improved performance and throughput of a computer or processor set. Aspects of the present invention relate generally to methods and systems that may include a rule analysis and group module, checker module, and data reuse module in operative communication with one another, the modules being configured to enhance existing role queues or workload management (WLM) systems to improve rule submission methods for incoming rules, queued rules, and running rules.

Data rules may include rule operators which may be compiled into a rule table. Data rules sharing similar rule tables may be grouped into a rule operator group. During execution, table data may be loaded once for a first data rule runtime within a rule operator group and reused for additional data rule runtimes without the need to reload table data for each individual data rule. This may include, for example, generating rule operators and a rule table having shared data rule operators and communicating the rule operator group to a shared compute node i.e., a compute node running multiple data rules concurrently, to reduce redundant loading of the table data, thereby improving computer or processor set efficiency and performance.

Implementations of the invention are necessarily rooted in computer technology. For example, the steps of reusing the table data associated with the first rule operator in the runtime of additional rule operators corresponding to the rule operator group and balancing a workload of each compute node based on the workload state, the time taken for the data rule at runtime, and the resource usage for the data rule at runtime by distributing data rules or ruler operator groups across compute nodes are computer-based and cannot be performed in the human mind.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
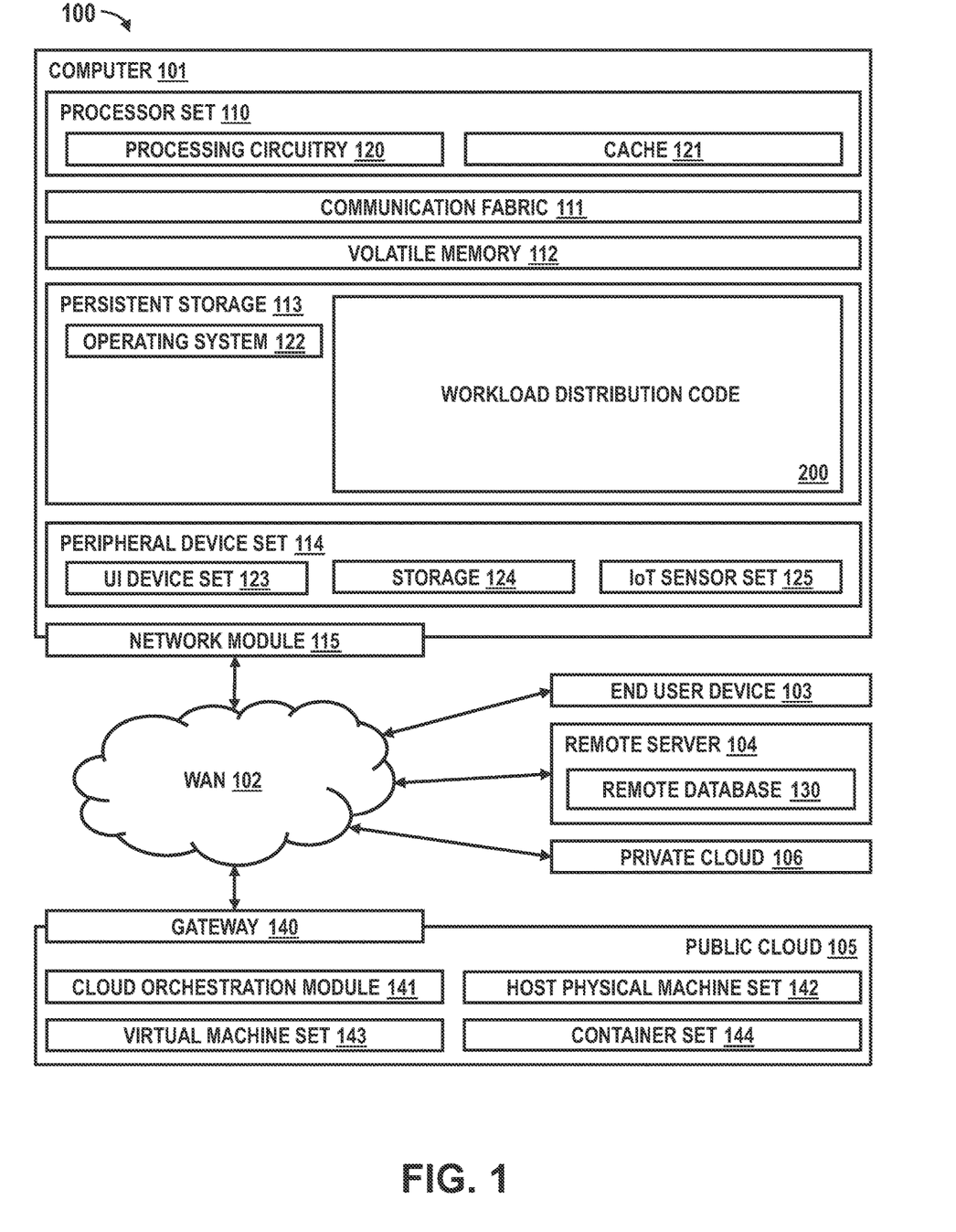
FIG. 1 depicts a computing environment according to an embodiment of the present invention.

Computing environment 100 contains an example of an environment for the execution of at least some of the computer code involved in performing the inventive methods, such as a workload distribution code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
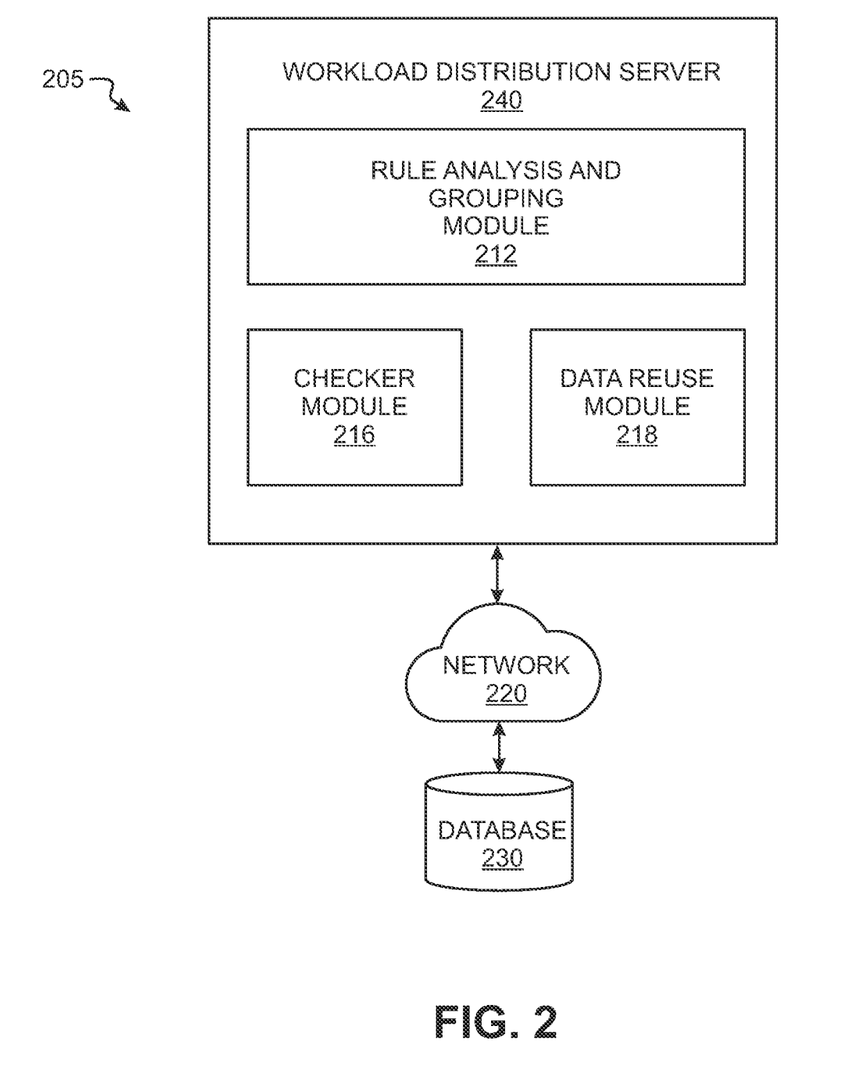
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes a workload distribution server 240 and an information database 230. The workload distribution server 240 and the information database 230 are in communication over a network 220. In an example, the workload distribution server 240 includes one or more instances of the computer 101 of FIG. 1, or one or more virtual machines or one or more containers running on one or more instances of the computer 101 of FIG. 1. The information database 230 may include one or more instances of the remote database 130 of FIG. 1. The network 220 may include one or more networks such as the WAN 102 of FIG. 1.

In embodiments, information database 230 of FIG. 2 includes data that may include business records that are created and received as part of a business's daily operation. In embodiments, the data may include data quality rules, rule data, rule operator data, rule table data, operator group names, operator names, data types, bind column data e.g., identifying data rules and rule operators as "new" or "exist" (previously retrieved by the system), runtime time weights, and CPU runtime weights.

In embodiments, the workload distribution server 240 of FIG. 2 includes a rule analysis and grouping module 212, a checker module 216, and a data reuse module 218 each of which may include modules of the code of block 200 of FIG. 1. In embodiments, the rule analysis and grouping module 212 generates rule operators including corresponding rule tables, which may be based on historical rule operator data provided from remote database 130 of remote server 104 of FIG. 1. Historical rule operator data may include rule operator time, e.g., the total time a rule operator takes during runtime of only the operator, or the entire rule which may contain multiple operators, and resource usage data, e.g., CPU and memory usage, monitored and stored over time. Generating rule operators, including corresponding rule tables, may include identifying rule operators within a data rule and retrieving rule operator time and resource usage data from a database to facilitate generating rule operator groups consisting of rule operators having similar rule operator time and resource usage data. In embodiments, the rule analysis and grouping module 212 also generates rule operator groups including multiple rule operators, to provide a time cost weight and resource weight for the data rules. In embodiments, the checker module 216 evaluates time and resource costs of data rules and rule operators to determine how rule operator groups should be evenly distributed the compute nodes to balance workloads. In embodiments, the data reuse module 218 retrieves rule table data and reuse table data for rule operators within an established rule operator group.

The rule analysis and grouping module 212, checker module 216, and data reuse module 218 may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The workload distribution server 240 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks;

fewer devices and/or networks; different devices and/or networks; or differently arranged devices and/or networks than illustrated in FIG. 2.

In embodiments, the rule analysis and grouping module 212 generates rule operator groups to provide a time cost weight and resource weight for the data rules. To generate the rule operator group, the rule analysis and grouping module 212 consults data rule definitions in a rule table, such as rule operators, rule cost (time), and resource cost (CPU and memory usage) for each rule operator name to generate rule operator groups including rule operators containing similar rule tables or rule table values. In embodiments, the rule analysis and grouping module 212 may generate rule operator groups based on operator type, number of operators, bindings columns, data types, and data volume. In embodiments, rule analysis and grouping module 212 may generate rule operator groups including maximum data rule limit to control the number of data rules within a rule operator group.

The rule analysis and grouping module 212 may also group queued rule operators containing similar rule tables prior to distributing rule operators to compute nodes or workers. Data rules, including their rule operators, may be incoming rules, queued rules, or running rules executed by a processor set, such as a compute node. As used herein, "compute node" may refer to a compute node or worker node. A compute node or compute nodes may be instances of remote server 104, a virtual machine running on remote server 104, or containers running on remote server 104, as depicted in FIG. 1. Rule operator groups may include maximum limits on the number of data rules within a rule operator group. The rule analysis and grouping module 212 retrieves, such as from the database 230, table data associated with the rule table of a first rule operator within the rule operator group and analyzes the data rule tables and groups the rules with the same tables together into rule operator groups.

Data rules may include rule operators which may be compiled into a rule table. Data rules sharing similar rule tables may be grouped into a rule operator group. In embodiments, the checker module 216 evaluates, i.e., monitors the time and resource costs of data rules, rule operators, and rule operator groups to evenly distribute workloads to the compute nodes. The checker module 216 evaluates rule operators and rule operator groups by retrieving time costs and resource costs from a database, such as database 230, and summing each of the baseline time costs and each of the resource (e.g., CPU) costs for operators within a rule. For example, the checker module 216 reports the total time needed to run a data rule based on a specific resource (e.g., with 2 CPU cores) and/or reports the resource needed to completely run a data rule based on a definite time frame (e.g., completes within 10 mins). To do this, the checker module 216 looks up time cost weights and resource weights provided by the operator groups. The checker module 216 may determine at least one checker metric, such as the runtime of a data rule or rule operator, associated with the runtime of a data rule. Checker metrics may include the total time to execute a data rule and a workload resource used to execute the data rule. The checker module 216 may determine a workload state retrieved from the database 230 or 630 as in FIG. 6, which is dependent on user input including data rules, each data rule CPU cost, total time cost (the time required for a compute node to execute a data rule or plurality of data rules), and remaining runtime for the shared compute node based on at least one metric. The checker metric, workload state, time taken, and resource usage may be used to balance compute node workloads, as described herein. In embodiments, the checker module 216 also monitors the states of all compute nodes. The states may include, but are not limited to, the number of data rules, each data rule resource cost (CPU and/or memory), each data rule's total time cost, and the remaining time for each data rule. The checker module 216 also continuously monitors the time taken and resource usage for the data rule to continuously revise the total workload and current states of each compute node by, in cooperation with the rule analysis and grouping module 212 and the data reuse module 218, balancing rule group or data rule distribution to compute nodes in order to balance workloads across compute nodes. For example, after concurrently submitting five data rules, three data rules could be running on both a first compute node (e.g., compute0) and a second compute node (e.g., compute1), but the other two data rules only run on compute0 nodes, even though compute1 node's computational resources are available and not busy. To balance rule group or data rule distribution, the system may submit three data rules in a first group to run on both a first compute node and a second compute node, and the other two data rules in a second group to also run on both the first compute node and the second compute node. Thus, by knowing how much time and resources are needed to run each of the data rules and the resources and time available for each of the compute nodes, the data rules (or rule groups) in the rule queue can be sent to the appropriate compute nodes to balance the workload for improved efficiency. In this way, the system may balance the workload of each compute node based on the workload state, the time taken for the data rule at runtime, and the resource usage for the data rule at runtime.

The data reuse module 218 may, for each rule group, retrieve table data from the information database 230 once for each rule group and reuse it for additional rule operators in the same rule operator group. Usually, data is uploaded for each data rule. However, because the data rules in each rule group have the same tables and are sent to the same compute node, the data is uploaded only once for all the data rules in the same rule group. By reusing the table data associated with the first rule operator in the runtime of additional data rules or rule operators corresponding to the rule operator group, the system provides efficiency in the process of retrieving table data per rule or rule operator. Data rules unable to be matched to a rule group may be sent individually to a compute node based on time and resource cost and availability.

Figure 3:
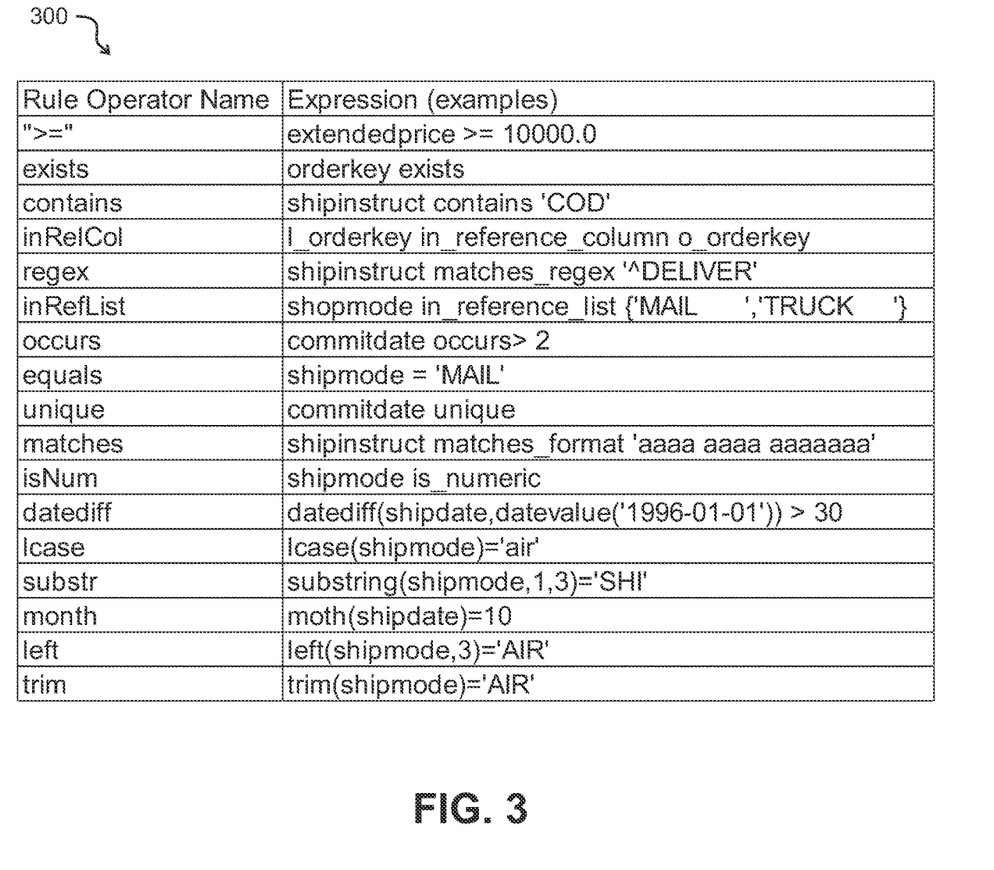
FIG. 3 shows an exemplary rule operator in accordance with aspects of the present invention.

Referring to FIG. 3, an example of table data may include table 300, including a variety of table data, example rule operator names, and corresponding example expressions that may be used to define rule operator groups created by the rule analysis and grouping module 212 depicted in FIG. 2. In embodiments, the rule operators include a list of rule operator names and associated exemplary commands for each rule operator name. Exemplary rule operators include the rule operator names in a first column (e.g., the left column in FIG. 3) and exemplary commands for the operator names in a second column (e.g., the right column in FIG. 3).

Figure 4:
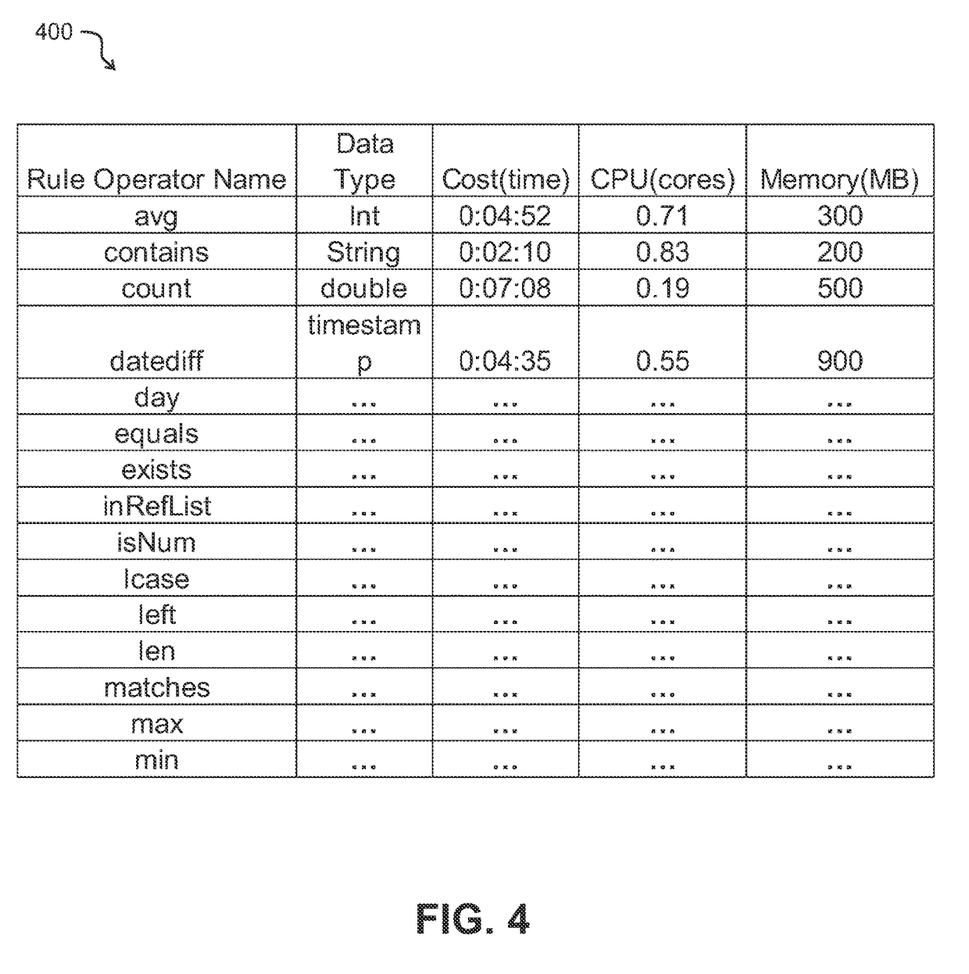
FIG. 4 shows an exemplary data rule cost and resource in accordance with aspects of the present invention.

Referring to FIG. 4, an example of table data may include a data rule cost table 400 that may include a variety of table data including rule operator names, data type, runtime costs (Cost (time)), and computing resource costs (CPU (cores) and Memory (MB)). The first (left) column lists the rule operator name; the second column lists the data type; and the third, fourth, and fifth column lists the time cost, CPU usage, and memory usage, respectively. Other table data may include network usage data, hard disk drive or solid state drive read and write speeds, disk input/output (I/O), and the like, which may be utilized by the grouping module 212, checker module 216, and data reuse module 218 depicted in FIG. 2, as previously described. The time and resource cost, CPU usage, and memory usage are determined for each rule operator name based on data from previous operation of the rule operator name. In embodiments, the rule time and resource cost are normalized for the same volume of data volume, e.g., over 1 million rows of data.

Figure 5:
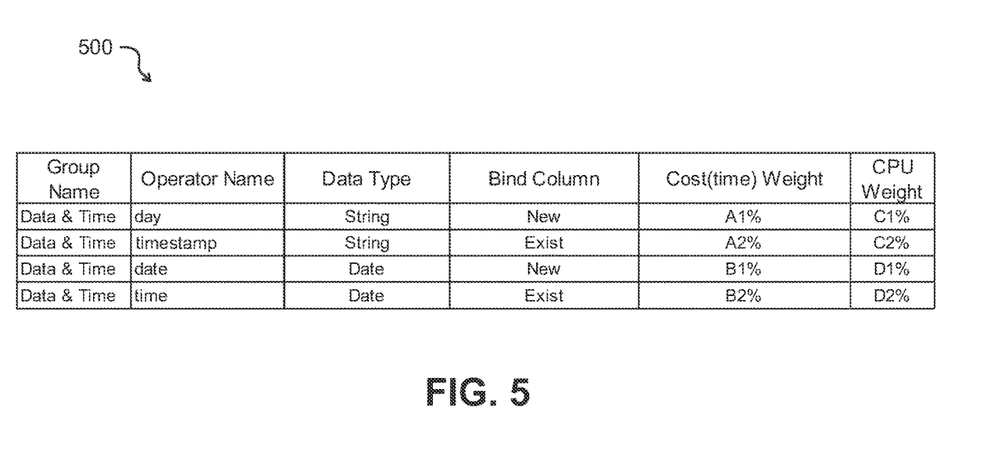
FIG. 5 shows an exemplary operator group in accordance with aspects of the present invention.

Referring to FIG. 5, an example of a rule operator group 500 is depicted that may include operator group data such as group name, operator name, data type, bind column, runtime cost weight (Cost (time) weight), and computing resource cost weight (CPU Weight). Other table data may include memory usage data, network usage data, hard disk drive or solid state drive read and write speeds, disk input/output (I/O), and the like, which may be utilized by the grouping module 212, checker module 216, and data reuse module 218 depicted in FIG. 2, as previously described. In embodiments, to generate the rule operator groups the rule analysis and grouping module 212 groups similar operators having similar rule table data into an operator group. For example, an operator group named "Date & Time," illustrated in FIG. 5, may include the following operators: day, timestamp, date, time, etc. In addition to date and time, other operator groups may include logic groups, checks, strings, mathematical groups, and others. Each operator group may include a final time cost and final CPU cost weight, i.e., the resource cost of the group, wherein the total weight for all groups is 100%.

Figure 6:
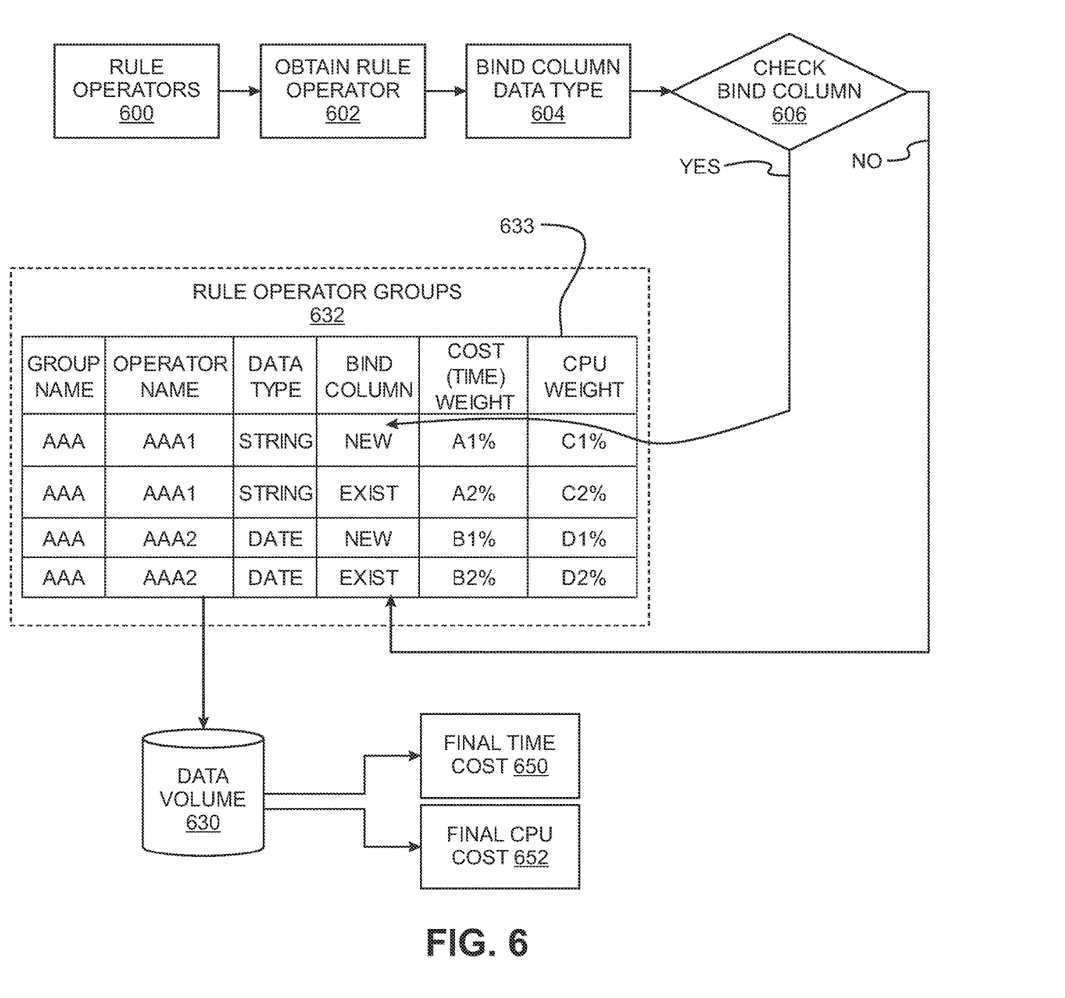
FIG. 6 shows an exemplary process for providing operator groups in accordance with aspects of the present invention.

FIG. 6 illustrates an exemplary process for generating operator groups, such as operating group 500 depicted in FIG. 5, by the rule analysis and grouping module 212 as depicted in FIG. 2. The steps show the flow of information and the actions taken to generate each operator group and are described with respect to the example operator group 500 depicted in FIG. 5. In box 600, the rule operators, as described above, are generated. In box 602, individual rule operators are obtained from the rule operators, such as retrieving a rule operator for a data rule. In box 604, for each rule operator, a bind column data type is obtained, for example, from database 230. In box 606, the rule analysis and grouping module 212 determines whether the bind column obtained is new or existing by reading rule operator groups 632 data tables 633. An operator can be bound to a rule table 633 column multiple times. Thus, if an operator data type binds to the column a first time, the operator is marked as "new" in the operator group data table 633; and subsequent binding of the operator within the same column is marked as "exist" in the operator group data table 633. Data table 633 shows an exemplary operator group named "AAA." The operator group includes the following column from left to right: operator group name (e.g., AAA), operator name (e.g., AAA1, AAA2, etc.), data type, bind column, time cost weight in percentage, and resource (CPU) weight in percentage. Although FIG. 6 shows only CPU weight, other resource weights, such as memory usage, may also be included. To generate each rule operator group, the process illustrated in FIG. 6 is repeated for each operator in each group. The time cost weight, and the resource weight are determined from the aforementioned data rule cost and resource. Because each of the total time cost weight and the total resource weight for each operator group should be 100%, the time cost weight and resource weight for each operator in the operator group can be determined from the rule cost and resource once all of the operators in the operator group is determined. Data volume 630, corresponding to database 230 in FIG. 2, may store user input including rule operators in rule operator groups used to determine the final time cost 650 and final resource cost 652 for the data rules or rule operator groups.

Figure 7:
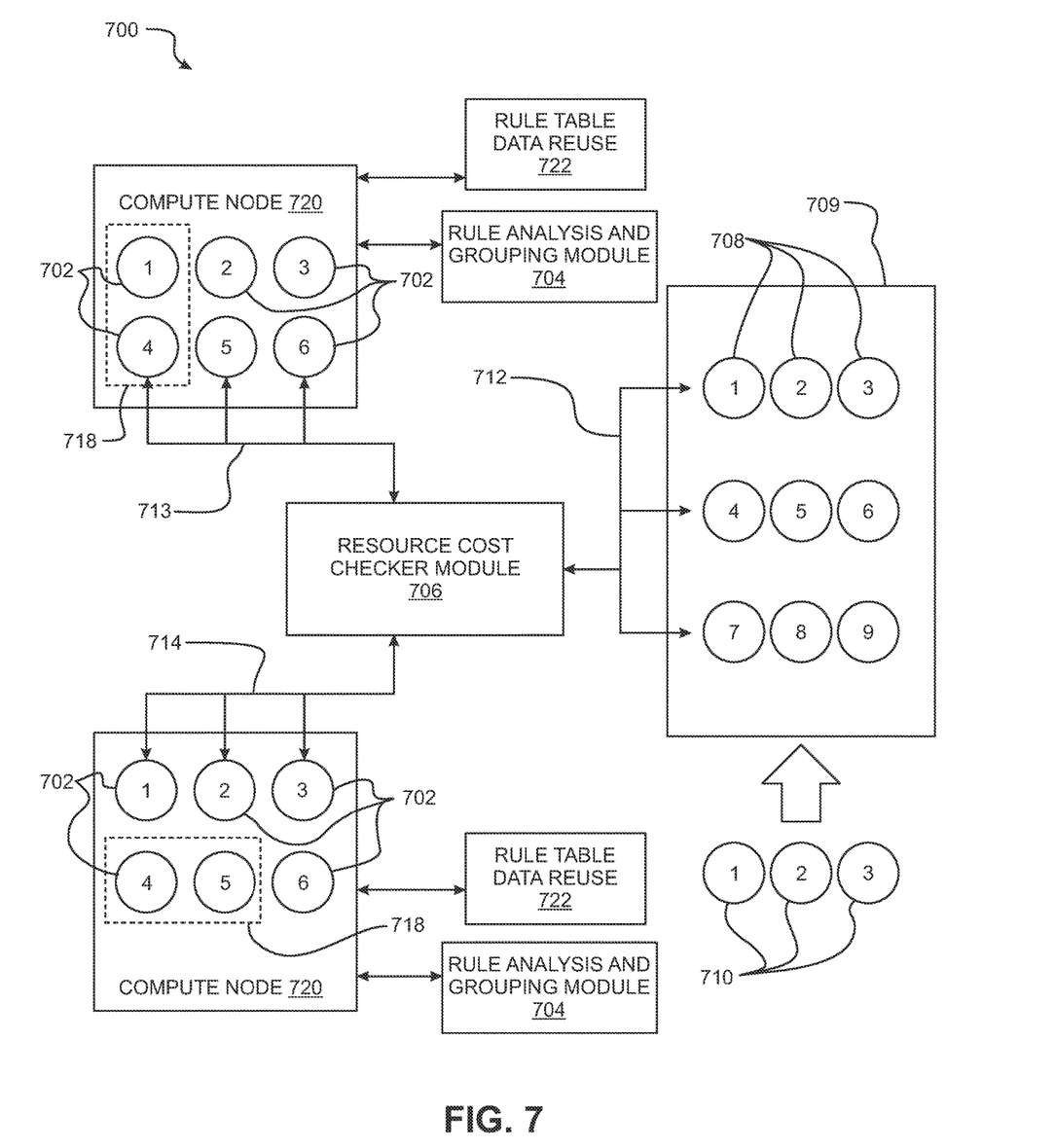
FIG. 7 shows an exemplary operation of a workload distribution server in accordance with aspects of the present invention.

FIG. 7 shows an exemplary operation of the workload distribution server 240 depicted in FIG. 2 in distributing queued data rules 708 from a rule queue 709 to a plurality of compute nodes 720. The queued data rules 708 from the rules queue 709 are analyzed by the rule analysis and grouping module 704, corresponding to rule analysis and grouping module 212 depicted in FIG. 2. Rule analysis and grouping module 704 analyzes rule tables, depicted as rule table 633 in FIG. 6, within rules and forms rule operator groups 718 containing running data rules 702 containing the same tables to be sent to the same compute node 720. Rule table data reuse 722, corresponding to data reuse module 218 depicted in FIG. 2, may load table data and reuse table data for the additional rule operators within a group, such as reusing table data corresponding to a first rule operator for each additional data rule within the rule operator group. As shown in FIG. 7, the rule operator groups 718 may contain two running data rules 702; however, more than two data rules may be in a rule group 718, as long as they all include the same rule tables. At the same time, the resource cost checker module 706, corresponding to the checker module 216 depicted in FIG. 2, obtains compute node states for each compute node 720, e.g., current resource usage and workload; calculates rule operator time and resource costs for queued data rules 708 in the rules queue 709 by consulting the rule operator groups 632 depicted in FIG. 6; and monitors the time and resource usage of each running data rule 702 at the compute nodes 720. The running data rules 702 (or running rule operator groups 632) are distributed to the compute nodes 720 based on the information provided by the checker module 216 and rule analysis module 704 i.e., based on the final time cost 650 and final resource cost 652 depicted in FIG. 6, for the data rules or rule operator groups relative to the compute capacity and compute timing available for a particular compute node 720.

Figure 8:
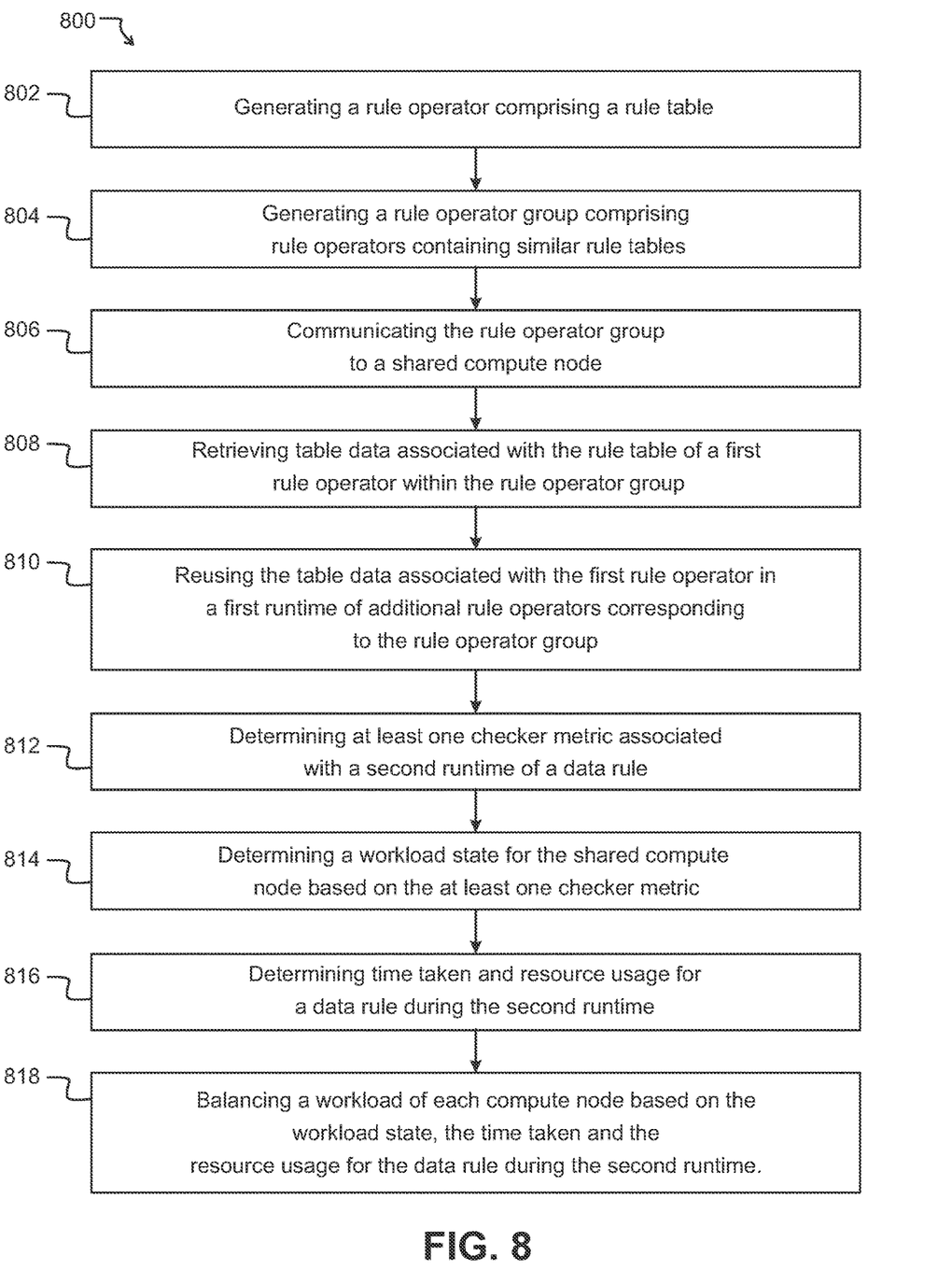
FIG. 8 shows a flowchart of an exemplary method in accordance with aspects of the present invention.

FIG. 8 shows a flowchart of an exemplary method in accordance with aspects of the present invention. Steps of the method may be carried out in the environment of FIG. 2. The method may include generating 802 a rule operator group comprising a rule table; generating 804 a rule operator group comprising rule operators containing similar rule tables; communicating 806 the rule operator group to a shared compute node; retrieving 808 table data associated with the rule table of a first rule operator within the rule operator group; reusing 810 the table data associated with the first rule operator in a first runtime of additional rule operators corresponding to the rule operator group; determining 812 at least one checker metric associated with a second runtime of a data rule; determining 814 a workload state for the shared compute node based on the at least one checker metric; determining 816 time taken and resource usage for a data rule during the second runtime; and balancing 818 a workload of each compute node based on the workload state, the time taken and the resource usage for the data rule during the second runtime.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement, and/or the service provider can receive payment from the sale of advertising content to one or more third parties.

In still additional embodiments, the invention provides a computer-implemented method, via a network. In this case, a computer infrastructure, such as computer 101 of FIG. 1, can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    generating, by a processor set, a rule operator comprising a rule table;
    generating, by the processor set, a rule operator group;
    communicating, by the processor set, the rule operator group to a shared compute node;
    retrieving, by the processor set, table data associated with the rule table of a first rule operator within the rule operator group;
    reusing, by the processor set, the table data associated with the first rule operator in a first runtime of additional rule operators corresponding to the rule operator group;
    determining, by the processor set, at least one checker metric associated with a second runtime of a data rule;
    determining, by the processor set, a workload state for the shared compute node based on the at least one checker metric;
    determining, by the processor set, time taken and resource usage for the data rule during the second runtime; and
    balancing, by the processor set, a workload of each compute node based on the workload state, the time taken, and the resource usage for the data rule during the second runtime.

2. The computer-implemented method of claim 1, wherein generating the rule operator is based on historical rule operator data.

3. The computer-implemented method of claim 1, wherein generating the rule operator group comprises grouping queued rules.

4. The computer-implemented method of claim 1, wherein the rule operator group comprises a maximum data rule limit.

5. The computer-implemented method of claim 1, wherein the at least one checker metric is selected from a group consisting of total time to execute a data rule and a workload resource used to execute the data rule.

6. The computer-implemented method of claim 1, wherein determining the workload state for the shared compute node comprises determining a number of data rules, each data rule resource cost, each data rule total time cost, and a remaining time for each data rule.

7. The computer-implemented method of claim 1, wherein reusing the table data comprises reusing the table data corresponding to the first rule operator for each additional data rule within the rule operator group.

8. The computer-implemented method of claim 1, wherein generating the rule operator group occurs based on at least one selected from a group consisting of operator type, number of operators, bindings columns, data types, and data volume.

9. The computer-implemented method of claim 1, wherein the rule table comprises a rule operator time and a resource cost.

10. A computer program product comprising one or more computer readable storage media having program instructions collectively stored on the one or more computer readable storage media, the program instructions executable to:
    generate a rule operator comprising a rule table;
    generate a rule operator group;
    communicate the rule operator group to a shared compute node;
    retrieve table data associated with the rule table of a first rule operator within the rule operator group;
    reuse the table data associated with the first rule operator in a first runtime of additional rule operators corresponding to the rule operator group;
    determine at least one checker metric associated with a second runtime of a data rule;
    determine a workload state for the shared compute node based on the at least one checker metric;
    determine a time taken and a resource usage for the data rule during the second runtime; and
    balance a workload of each compute node based on the workload state, the time taken and the resource usage for the data rule during the second runtime.

11. The computer program product of claim 10, wherein generating the rule operator is based on historical rule operator data.

12. The computer program product of claim 10, wherein generating the rule operator group comprises grouping queued rules.

13. The computer program product of claim 10, wherein the rule operator group comprises a maximum data rule limit.

14. The computer program product of claim 10, wherein the at least one checker metric is selected from a group consisting of total time to execute a data rule and a workload resource used to execute the data rule.

15. The computer program product of claim 10, wherein determining the workload state for the shared compute node comprises determining a number of data rules, each data rule resource cost, each data rule's total time cost, and a remaining time for each data rule.

16. The computer program product of claim 10, wherein reusing the table data comprises reusing the table data corresponding to the first rule operator for each additional data rule within the rule operator group.

17. The computer program product of claim 10, wherein generating the rule operator group occurs based on at least one selected from a group consisting of operator type, number of operators, bindings columns, data types, and data volume.

18. The computer program product of claim 10, wherein the rule table comprises a rule operator time and a resource cost.

19. A system comprising:
- a processor set, one or more computer readable storage media, and program instructions collectively stored on the one or more computer readable storage media, the program instructions executable to:
- generate a rule operator comprising a rule table;
- generate a rule operator group;
- communicate the rule operator group to a shared compute node;
- retrieve table data associated with the rule table of a first rule operator within the rule operator group;
- reuse the table data associated with the first rule operator in a first runtime of additional rule operators corresponding to the rule operator group;
- determine at least one checker metric associated with a second runtime of a data rule;
- determine a workload state for the shared compute node based on the at least one checker metric;
- determine a time taken and a resource usage for the data rule during the second runtime; and
- balance a workload of each compute node based on the workload state, the time taken and the resource usage for the data rule during the second runtime.

20. The system of claim 19, wherein reusing the table data comprises reusing the table data corresponding to the first rule operator for each additional data rule within the rule operator group.

* * * * *